United States Patent Office 2,977,386
Patented Mar. 28, 1961

2,977,386

ABSORPTION OF FORMALDEHYDE IN ALKALINE UREA SOLUTION

Mearl A. Kise, Portsmouth, Va., assignor to Allied Chemical Corporation, a corporation of New York No Drawing. Filed Apr. 8, 1955, Ser. No. 500,303

8 Claims. (Cl. 260—553)

This invention relates to the recovery of formaldehyde from water-methanol-formaldehyde vapors; in particular, it relates to the recovery of formaldehyde from such vapors by absorption in alkaline urea solution.

In the manufacture of many urea-formaldehyde resins, the removal of excess water by vaporization is a very important step of the process. This vaporization of water is accompanied by the release of formaldehyde vapors which are usually lost, since no economic method of removing them was heretofore available. The normal method of separating entrained liquid from water; namely, distillation, is not suitable in this instance. The utility of pressure distillation as a means of recovering formaldehyde from dilute aqueous solutions is limited by the fact that formaldehyde tends to undergo the Cannizzaro reaction, forming methanol and formic acid on heating with water. The rate at which this reaction takes place increases rapidly with rising temperatures. Separation by pressure distillation is, of course, not impossible; but pressure distillation for this purpose requires a high capital expenditure for a suitable distillation column; and the product, furthermore, would contain an undesirably high methanol concentration. In view of the economics of the situation, it has heretofore been deemed advisable to forego the recovery of formaldehyde from the vapors driven off during the manufacture of the urea formaldehyde resins.

It is an object of this invention to provide an economically suitable process for recovering formaldehyde from water-methanol-formaldehyde vapor mixtures. It is a further object of this invention to provide a method of extracting formaldehyde from the water-methanol-formaldehyde vapors by an absorption technique.

It is a still further object of this invention to provide a method of recovering formaldehyde from water vapor mixtures in the form of a commercially usable product.

It has been found that these objects, and other advantages incidental thereto, can be obtained by absorption of the formaldehyde from the vapors in an alkaline urea solution.

In accordance with this invention, vapors which are given off during the manufacture of urea-formaldehyde resins and which contain formaldehyde, usually in the presence of methanol, are treated with an alkaline urea solution under controlled conditions to recover the formaldehyde in a form suitable for use in the production of marketable urea-formaldehyde materials.

The process of this invention is one which is susceptible of being carried out in a continuous manner under controlled temperature, pressure and pH. Under preferred absorption conditions, the temperature is held within the range of 35–45° C. and the pressure at 40–60 mm. of mercury while the pH is maintained between 9 and 12.

When the treatment is carried out in a continuous manner, an absorber column is preferably used. In this case, the alkaline urea solution is permitted to trickle downwardly over a packing material of the type commonly used in columns of this type; such as, for example, Berl Saddles, while the vapors are passed upwardly through the column in countercurrent to the solution flow.

The efficiency of this process is greatly dependent upon the high pH maintained in the absorber solution. While the useful pH range lies between 9 and 12, the preferred operating range has been found to lie between 10 and 11. The alkalinity of the solution may, of course, be brought about by the addition of any number of alkaline materials; as for example, compounds of alkali or alkaline earth metals. The most commonly used materials for this purpose include sodium hydroxide, calcium hydroxide, and barium hydroxide.

When the absorbing column is operating efficiently, substantially all of the formaldehyde will be removed from the vapors by a single pass through the absorber column; thus, in some cases, the vapor leaving the absorber will contain as little as 0.05 weight percent of formaldehyde. The absorbing solution may, however, be recirculated through the absorbing column until the mol ratio of formaldehyde to urea within the solution reaches about 0.8 to 1. At formaldehyde to urea mol ratio above—0.8 to 1—the absorbing solution becomes turbid and exhibits a strong tendency to solidify.

An unexpected feature of this recovery process resides in the high efficiency of the recovery operation at designated reaction conditions. Since the formation of methylol ureas (the compounds formed as a result of the absorption) is an organic type of reaction which is generally much slower than inorganic reactions, it is surprising that conditions could be found whereby mass velocities as high as 1400 lb./hr./sq. ft. can be used with contact time of a few seconds for 98 percent efficient recovery of formaldehyde from the gas. It might well be thought that such a flow of gas through the recovery system would tend to strip formaldehyde from the scrubber solution as the formaldehyde to urea ratio increased. It was found that such a loss of formaldehyde does not occur. Desirable results have been obtained with a relatively broad range of mass velocity of gas through the absorber, such as 50–1400 lbs./hr./sq. ft. The preferred range, however, is about 100–1100 lbs./hr./sq. ft.

Naturally, temperature is also an important control point in the reaction. It has been found that the temperature which should be maintained within the absorber column lies within the range of 25 to 100° C., if efficient recovery is to be obtained, under the other broad general conditions. The preferred temperature, however, is 35 to 45° C. This latter temperature is particularly suitable when the process is to be operated at pressures of about 40 to 60 mm. of mercury.

As has been previously indicated, the pressure within the absorber column may range anywhere from 30 to 760 mm. of mercury; the preferred range, however, is 40 to 60 mm. of mercury, since this is the preferred operating pressure range of the evaporator of the urea-formaldehyde concentrating plant, one of the sources of the vapor.

It has been further found that for good results, the solids dissolved in the absorption solution should be less than 60%. The preferred range is, however, one lying between 35 and 60%. The amount of solution circulating through the absorber should, of course, be sufficient to maintain a wet pack.

The product which can be obtained in accordance with this invention is one which contains approximately 20 weight percent formaldehyde and 40 weight percent urea. This solution is suitable for the production of a stable liquid product of the type described in U.S. Patent 2,652,377, which product contains between 60 and 90% total solids in water and in which the solid content is soluble in the water at atmospheric temperatures. These products are mobile fluids at room temperatures, which may be readily pumped or readily caused to flow by gravity from one container to another. They are true solutions and may be made more fluid by warming or adding water. They differ from resin gels or glasses of comparable water content, which although frequently clear, are solids in the sense that a mix of these gels or glasses may be broken up into separate particles which retain their particle character at room temperature for long periods of time; whereas, the compositions which may be prepared from the products of this invention are coalescent, mobile liquids at room temperatures, although those with the lower water contents are relatively viscous.

These stable solutions are particularly useful because of their high concentration of formaldehyde-urea reaction products which are not resins but are essentially the chemical equivalents of urea and formaldehyde, insofar as concerns their forming resins when suitably treated. The preparation of these stable solutions, and their use in the preparation of resins, is discussed in detail in the afore-mentioned patent.

*Example 1*

An absorber solution containing 50 weight percent urea, which has been adjusted to a pH of 11 by the addition of a 2 N sodium hydroxide solution was passed downwardly through a 25 foot absorber column packed with Berl saddles, at a mass velocity of 3 gal./min./sq. ft. The solution was maintained at about 39° C., while the system was maintained at a pressure of about 48 mm. of mercury. During this period, aqueous formaldehyde vapor, containing 4.86 weight percent $CH_2O$, was passed upwardly through the absorber column at the mass velocity of 145 lbs./hr./sq. ft., the vapors passing through the absorber column countercurrent to the urea solution flow. The vapors leaving the absorber were found to contain 0.05 weight percent formaldehyde; whereas, the absorber solution leaving the column contained 39.1 percent urea and 4.7 percent formaldehyde. The absorber efficiency for this particular run was 99 percent. Similar runs at pH's of 10—9.5—9 gave absorber efficiency of 89—74—64 respectively.

*Example 2*

An absorber solution containing 50 weight percent of urea and 10 weight percent formaldehyde and which had been adjusted to a pH of 11 by the addition of 2 N sodium hydroxide solution was passed downwardly through a 25 foot absorber column packed with Berl saddles, at a mass velocity of 3 gal./min./sq. ft. through the absorber. The temperature of this solution was maintained at about 42° C. during its passage through the absorber column. Its pH was adjusted by periodic addition of 2 N sodium hydroxide solution. During the period of the absorber solution's passage through the column, a vapor containing 10 weight percent formaldehyde was fed to the bottom of the column. It passed in countercurrent relationship to the absorber solution, and at a mass velocity of 145 lb./hr./sq. ft. through the absorber. Introduction and withdrawal of vapor were controlled to maintain an absolute pressure between 40 and 50 mm. of Hg. Upon discharge from the top of the column it was found to contain 0.23 weight percent formaldehyde; whereas, the absorber solution contained 40.9 percent urea and 18.0 percent formaldehyde. This gives an absorption efficiency of 98 percent. When similar runs were made at pH's of 10 and 9, the absorption efficiencies were shown to be 94 and 82 respectively.

While the above description submitted herewith discloses a preferred and practical embodiment of the method of recovering formaldehyde in accordance with this invention, it will be understood that the specific details described are by way of illustration and are not to be construed as limiting the scope of the invention.

I claim:

1. In the method of recovering a commercially useable formaldehyde product from a formaldehyde water vapor mixture, the steps comprising passing an alkaline urea solution through an absorbing tower, passing vapor containing formaldehyde into said tower and bringing it into intimate contact with said alkaline solution to absorb the formaldehyde from said vapor, removing the water which had been in admixture with the formaldehyde from the tower in the form of vapor and collecting the alkaline solution containing the absorbed formaldehyde.

2. In the method of recovering a commercially useable formaldehyde product from a formaldehyde water vapor mixture, the steps comprising bringing said vapor into intimate contact with an alkaline urea solution having a pH of 9–12 to absorb the formaldehyde therein, maintaining the temperature within the contact area within the range of 25–100° C., at a pressure of 30–760 mm. Hg, removing the water which had been in admixture with the formaldehyde from the contact area in the form of vapor and collecting the alkaline solution containing the absorbed formaldehyde.

3. In the method of recovering a commercially useable formaldehyde product from a formaldehyde water vapor mixture, the steps comprising passing an alkaline urea solution, having a pH of 10–11, through an absorbing tower, passing vapor containing formaldehyde into said tower and bringing it into intimate contact with said alkaline solution to absorb the formaldehyde from said vapor, while maintaining the temperature in said tower, between 35–45° C. at a pressure of 40–60 mm. Hg, removing the water which had been in admixture with the formaldehyde from the tower in the form of vapor and collecting the alkaline solution containing the absorbed formaldehyde.

4. In the method of recovering a commercially useable formaldehyde product from a formaldehyde water vapor mixture, the steps comprising passing an alkaline urea solution, having a pH of 10–11, through an absorbing tower, passing vapor containing formaldehyde through said tower, at a mass velocity of 100–1100 lb./hr./sq. ft. and bringing it into intimate contact with said alkaline solution to absorb the formaldehyde from said vapor, while maintaining the temperature within said tower between 35–45° C., at a pressure of 40–60 mm. Hg, removing the water which had been in admixture with the formaldehyde from the tower in the form of vapor and collecting the alkaline solution containing the absorbed formaldehyde.

5. In the method of recovering a commercially useable formaldehyde product from a formaldehyde water vapor mixture, the steps comprising passing an alkaline urea solution, having a pH of 9–12, through an absorbing tower, passing vapor containing formaldehyde through said tower at a mass velocity of 50–1400 lb./hr./sq. ft. and bringing it into intimate contact with said alkaline solution to absorb the formaldehyde from said vapor, while maintaining the temperature in said tower between 25–100° C. at a pressure of 30–760 mm. Hg, removing the water which had been in admixture with the formaldehyde from the tower in the form of vapor and collecting the alkaline solution containing the absorbed formaldehyde.

6. In the method of recovering a commercially useable formaldehyde product from a formaldehyde water vapor mixture, the steps comprising circulating an alkaline urea solution, having a pH of 9–12, through an absorbing tower at a rate sufficient to maintain a wet pack, passing water-formaldehyde vapor through said tower countercurrent to said alkaline urea solution at a mass velocity of said vapor through said absorber of 50 to 1400 lb./hr./sq. ft. maintaining a temperature of 25 to 100° C. and a pressure of 30 to 760 mm. of mercury within said tower, removing the water which had been in admixture with the formaldehyde from the tower in the form of vapor and recirculating said alkaline urea mixture until the maximum formaldehyde to urea mol ratio is 0.8.

7. In the method of recovering a commercially useable formaldehyde product from a formaldehyde water vapor mixture, the steps comprising circulating an alkaline urea solution, having a pH of 10-11, through an absorbing tower at a rate sufficient to maintain a wet pack, passing water-formaldehyde vapor through said tower counter-current to said alkaline urea solution at a mass velocity of said vapor through said absorber of 50 to 1400 lb./hr./sq. ft. maintaining a temperature of 35 to 45° C., and a pressure of 40-60 mm. of mercury, within said tower, removing the water which had been in admixture with the formaldehyde from the tower in the form of vapor and recirculating said alkaline urea mixture until the maximum formaldehyde urea mol ratio is 0.8.

8. In the method of recovering a commercially useable formaldehyde product from a formaldehyde vapor mixture, the steps comprising continuously circulating an alkaline urea solution, having a pH of 9-12 and a dissolved solid content of less than 60%, through an absorbing tower at a rate sufficient to maintain a wet pack, passing water-formaldehyde vapor through said tower counter-current to said alkaline urea solution at a mass velocity of said vapor through said absorber of 50 to 1400 lbs./hr./sq. ft. maintaining a temperature of 25 to 100° C. and a pressure of 30 to 769 mm. of mercury within said tower, removing the water which had been in admixture with the formaldehyde from the tower in the form of vapor and recirculating said alkaline urea mixture until the maximum formaldehyde urea ratio is 0.8.

References Cited in the file of this patent

UNITED STATES PATENTS

| | | |
|---|---|---|
| Re. 23,174 | Kvalnes | Nov. 29, 1949 |
| 2,372,085 | Jones et al. | Mar. 20, 1945 |
| 2,652,129 | Benedict | Sept. 15, 1953 |
| 2,652,377 | Kise | Sept. 15, 1953 |
| 2,729,611 | Chesley et al. | Jan. 3, 1956 |

UNITED STATES PATENT OFFICE
CERTIFICATE OF CORRECTION

Patent No. 2,977,386                        March 28, 1961

Mearl A. Kise

It is hereby certified that error appears in the above numbered patent requiring correction and that the said Letters Patent should read as corrected below.

Column 3, lines 27 and 48, for "saddles", each occurrence, read -- Saddles --; column 5, line 15, after "formaldehyde", second occurrence, insert -- water --; column 6, line 6, for "769" read -- 760 --.

Signed and sealed this 19th day of December 1961.

(SEAL)
Attest:

ERNEST W. SWIDER
Attesting Officer

DAVID L. LADD
Commissioner of Patents
USCOMM-DC